June 6, 1944.  R. B. COLLINS  2,350,448

GLAND SEALING APPARATUS

Filed April 13, 1942

Inventor:
Robert B. Collins
By Lee J. Gary
Attorney.

Patented June 6, 1944

2,350,448

UNITED STATES PATENT OFFICE 2,350,448

GLAND SEALING APPARATUS

Robert B. Collins, Chicago, Ill., assignor to Universal Oil Products Company, Chicago, Ill., a corporation of Delaware Application April 13, 1942, Serial No. 438,751

2 Claims. (Cl. 259—25)

This invention relates to an improved form of gland sealing apparatus to be employed in connection with rotary mixers, pumps and the like. It is particularly advantageous as applied to mixers or pumps which are intended for use in handling extremely corrosive and poisonous materials such as mixtures of hydrocarbon compounds and hydrogen fluoride which are encountered for instance is the process of alkylating isoparaffins with olefins, employing hydrogen fluoride as a catalyst.

It is well known in the art that hydrogen fluoride, especially when water is present, is a very corrosive compound. It is also well known that hydrocarbon compounds attack various materials, particularly those compounded with rubber. The combination of these two compounds in a mixture results in a fluid for which suitable packing materials are either non-existant or are relatively unobtainable.

Gland sealing has heretofore been used in conjunction with centrifugal pumps, and is generally obtained as follows: A neutral fluid is introduced to an intermediate point in the stuffing box at a pressure sufficient to maintain a positive flow of said fluid away from the gland and into the pump or mixer, thereby preventing any contacting of the packing by the detrimental fluid. Such system of operation has met with very good success when employed as a means for preventing infiltration of air into the pump for the reason that the gland sealing fluid need be maintained at only sufficient pressure to overcome any leakage of air through the gland and into the pump from the surrounding atmosphere. In cases where it is desired to employ the sealing fluid as a means for eliminating corrosion of the packing, pressures higher than those in the pump or mixer are necessary, in some instances, especially in connection with mixers, this may be considerable and will cause excessive leakage of sealing fluid from the gland.

The features of my invention provide means for eliminating the difficulties which have heretofore been encountered in methods for protecting the packing in stuffing boxes from contact by corrosive fluids. It is possible, when employing my invention, to maintain a positive flow of neutral fluid from the stuffing box into the pump or mixer, thereby preventing any of the injurious materials from coming in contact with the packing and causing its deterioration. It is also possible in many instances to entirely eliminate auxiliary pumps, by utilizing my invention as the sole pumping means for supplying the sealing fluid to the stuffing box. This means a possible reduction in both installation and operating costs. The use of my invention also adds to the safety of the operators because of the more effective manner in which corrosive materials are prevented from reaching the stuffing box.

The principal feature of my invention resides in the provision of a small centrifugal pump impeller element mounted upon the rotating shaft about which the stuffing box is being employed to maintain a seal. By selecting the proper size and design for this element, according to the speed of the rotating shaft, a pressure of neutral fluid sufficient to overcome the internal pressure of the mixer or pump may be obtained.

Another feature of the invention is embodied in the action of the centrifugal element upon the fluid within the mixer or pump. The flat inner surface of this element, rotating at high speed will act as a throw ring and any material coming in contact therewith will be thrown, by centrifugal force, outwardly away from the shaft and its accompanying stuffing box.

The accompanying diagrammatic drawing showing my invention as applied to a rotary mixer, and the following description thereof are included in this specification in order to make the features of the invention more apparent.

Figure 1:
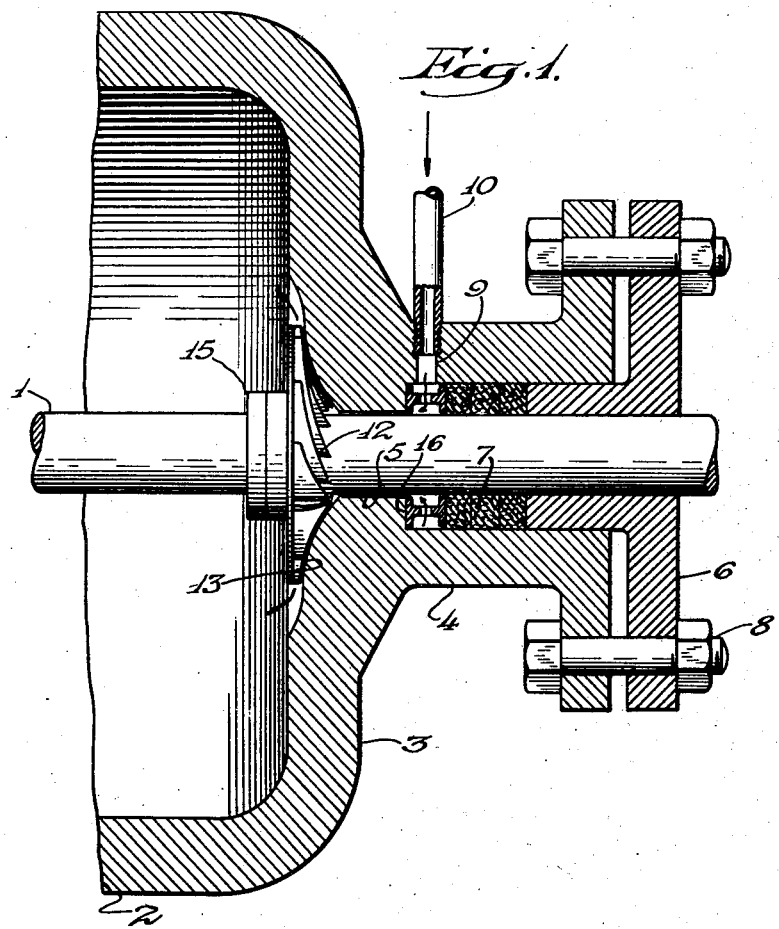
Fig. 1 is a sectional view of a stuffing box and a portion of a mixer shaft and vessel with which my invention has been incorporated.
Figure 3:
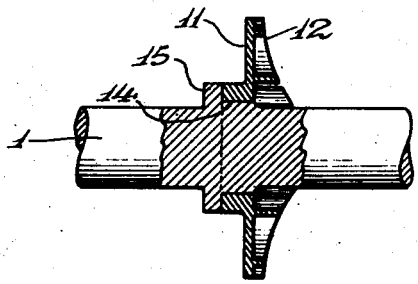
Fig. 3 is a cross-sectional view of the centrifugal pump element shown in Fig. 2.
Figure 2:
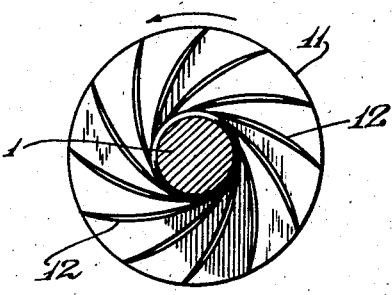
Fig. 2 is a view of the centrifugal pump element taken from a plane which perpendicularly intersects the shaft on the gland side of said element.

Referring now to the drawing, a rotary shaft 1, journaled in bearings not shown and motivated by a suitable source of power, is connected to the desired turbine or propeller mixing device within the vessel 2, a portion of which is shown. The above mentioned motivating source and suitable mixing device not being a part of the invention are not shown.

The mixer vessel 2, is provided with a head 3 which in turn is provided with a stuffing box 4. The shaft projects through the port 5, provided in the head 3, and through the stuffing box. The stuffing box gland 6, embraces the shaft and provides means for compressing a suitable packing 7. This gland may be made adjustable by means of bolts 8, as herein illustrated or the gland may be threaded to engage a threaded portion in the stuffing box.

A suitable port 9, is provided in communication with the interior of said stuffing box to furnish means for supplying a neutral or uninjurious fluid thereto. A suitable perforate spacing member or so-called ring brass 16 is provided in the stuffing box to position the packing 7 in a manner whereby a channel is provided for passage of fluid introduced through the conduit 10, and port 9, to enter the space formed between the walls of the port 5, and the shaft 1.

Mounted on the shaft 1 is my novel centrifugal pump impeller element comprising the disc-like member 11, one face of which is provided with a plurality of blades 12. The size of the disc 11 and the number and shape of the blades 12, are dependent upon and adapted for the speed of the shaft and the pressure conditions within the mixer to be overcome. The selected size and shape of these blades will also govern the shape of the adjacent portion 13, of the head 3, which in conjunction with the impeller will operate as a pump.

The impeller unit may be firmly secured by means of its hub to the shaft by machining to interlocking engagement with the enlarged shaft portion 14 so that they may be pressed together as shown, thereby making the impeller substantially integral with the shaft, or the impeller may be fastened to the shaft by means of set screws, pins, keys or in any other suitable manner. A shoulder portion 15 serves as a stop to govern the spaced relationship between the impeller blades and the cooperating head portion 13, which acts as the pump casing.

The impeller blades 12 may be constructed in forms other than that shown and remain within the scope of the invention, and directional vanes may be placed around the periphery of the rotor 11 when desired.

When desired all or a portion of the reactant materials which are not corrosive as regards the packing may be introduced to the mixer or pump by means of the conduit 10.

I claim as my invention:

1. An apparatus of the class described comprising a mixer having a port through an end thereof, a rotatable shaft extending through said port into the mixer, a stuffing box embracing said shaft exteriorly of the mixer and having a gland at one end thereof, said shaft being spaced from the walls of said port to provide communication between the stuffing box and the interior of the mixer, means for supplying fluid to the stuffing box, and an impeller element mounted on the shaft within the mixer adjacent said port, said element being constructed and arranged to draw fluid from the stuffing box into the mixer through the space between the shaft and the walls of said port.

2. An apparatus of the class described comprising a mixer having a port through an end thereof, a rotatable shaft extending through said port into the mixer, a stuffing box embracing said shaft exteriorly of the mixer and having a gland at one end thereof, a spacing member in the stuffing box at the opposite end thereof adjacent said end of the mixer, packing material in the stuffing box between said member and gland, means for supplying fluid to the stuffing box adjacent said opposite end thereof, said shaft being spaced from the walls of said port to provide communication between said opposite end of the stuffing box and the interior of the mixer, and a centrifugal pump impeller element mounted on the shaft within the mixer adjacent said port, said element being constructed and arranged to draw fluid from the stuffing box into the mixer through the space between the shaft and the walls of said port.

ROBERT B. COLLINS.